United States Patent
Sompalli et al.

(10) Patent No.: US 6,524,736 B1
(45) Date of Patent: Feb. 25, 2003

(54) METHODS OF PREPARING MEMBRANE ELECTRODE ASSEMBLIES

(75) Inventors: Bhaskar Sompalli, Rochester, NY (US); Hubert Gasteiger, Rochester, NY (US); Mark F. Mathias, Pittsford, NY (US); Michael Scozzafava, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 48 days.

(21) Appl. No.: 09/691,745

(22) Filed: Oct. 18, 2000

(51) Int. Cl.$^7$ .............................. H01M 4/86; H01M 4/88
(52) U.S. Cl. .......................... 429/42; 502/101; 427/115
(58) Field of Search .......................... 429/42; 427/115; 502/101

(56) References Cited

U.S. PATENT DOCUMENTS

| | | | |
|---|---|---|---|
| 3,953,566 A | | 4/1976 | Gore |
| 4,350,608 A | * | 9/1982 | Gestaut .................. 427/115 X |
| 4,876,115 A | | 10/1989 | Raistrick |
| 5,211,984 A | | 5/1993 | Wilson |
| 5,234,777 A | | 8/1993 | Wilson |
| 5,272,017 A | | 12/1993 | Swathirajan et al. |
| 5,316,871 A | | 5/1994 | Swathirajan et al. |
| 5,330,860 A | | 7/1994 | Grot et al. |
| 5,409,588 A | | 4/1995 | Mushiake et al. |
| 5,547,551 A | | 8/1996 | Bahar et al. |
| 5,599,614 A | | 2/1997 | Bahar et al. |
| 5,635,041 A | | 6/1997 | Bahar et al. |
| 5,707,755 A | | 1/1998 | Grot |
| 5,723,173 A | * | 3/1998 | Fukuoka et al. ............. 427/115 |
| 5,858,264 A | | 1/1999 | Ichino et al. |
| 6,054,230 A | | 4/2000 | Kato |
| 6,074,692 A | | 6/2000 | Hulett |
| 6,127,059 A | * | 10/2000 | Kato .......................... 429/42 X |
| 6,127,061 A | * | 10/2000 | Shun et al. ................ 429/42 X |
| 6,187,468 B1 | | 2/2001 | Shinkai et al. ................. 429/42 |

FOREIGN PATENT DOCUMENTS

| | | | | |
|---|---|---|---|---|
| JP | 6-013085 | * | 1/1994 | ............ H01M/4/88 |
| WO | WO 99/34466 | | 7/1999 | |

OTHER PUBLICATIONS

International Search Report, International Application No. PCT/US02/08083, International Filing Date Mar. 18, 2002, Date of Report is Aug. 20, 2002.
Wilson et al., Thin–Film Catalyst Layers for Polymer Electrolyte Fuel Cell Electrodes, *Journal of Applied Electrochemistry*, 22 (1992), pp. 1–7, (Month unknown).
Proceedings of the First International Symposium on Proton Conducting Membrane Fuel Cells, Kolde et al., "Advanced Composite Polymer Electrolyte Fuel Cell Membranes," *Electrochemical Society Proceedings*, vol. 95–23, pp. 192–201, (Date unknown).
Advances in Electrochemical Science and Engineering, vol. 5, Gottesfeld et al., "Polymer Electrolyte Fuel Cells," WILEY–VCH, (Date unknown).

* cited by examiner

*Primary Examiner*—Stephen Kalafut
(74) *Attorney, Agent, or Firm*—Karl F. Barr, Jr.; Cary W. Brooks; Linda M. Deschere

(57) ABSTRACT

A method of making a membrane electrode assembly is provided. The method includes using a porous support to control the drying of the electrode, and the use of wettable and non-wettable solvents to control the seepage of ionomer into the porous support.

27 Claims, 4 Drawing Sheets

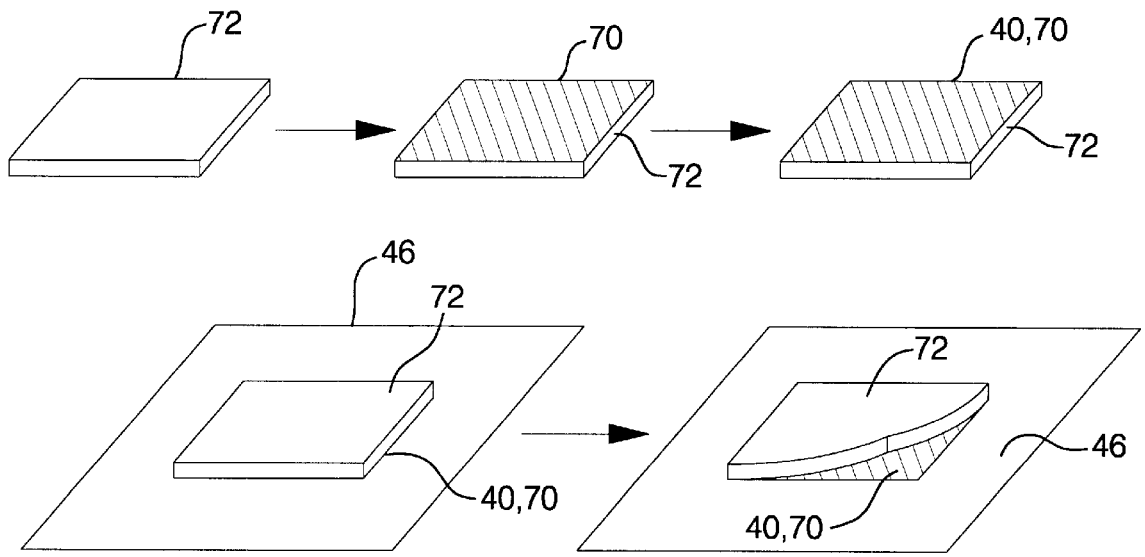
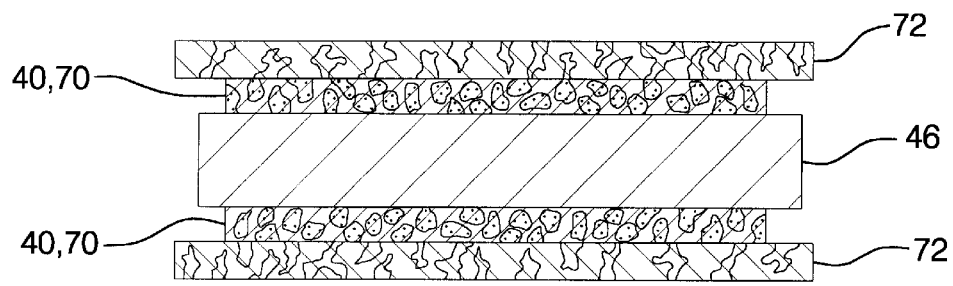
FIG. 6
FIG. 7
FIG. 8

METHODS OF PREPARING MEMBRANE ELECTRODE ASSEMBLIES

FIELD OF THE INVENTION

This invention relates to PEM/SPE fuel cells, and more particularly to a method of making electrodes and combination membrane electrode assembly.

BACKGROUND OF THE INVENTION

Electrochemical cells are desirable for various applications, particularly when operated as fuel cells. Fuel cells have been proposed for many applications including electrical vehicular power plants to replace internal combustion engines. One fuel cell design uses a solid polymer electrolyte (SPE) membrane or proton exchange membrane (PEM), to provide ion exchange between the anode and cathode. Gaseous and liquid fuels are useable within fuel cells. Examples include hydrogen and methanol, with hydrogen being favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. A typical fuel cell is described in U.S. Pat. No. 5,272,017 and U.S. Pat. No. 5,316,871 (Swathirajan et al.).

Important aspects of a fuel cell include reaction surfaces where electrochemical reactions take place, catalysts which catalyze such reactions, ion conductive media, and mass transport media. The cost of power produced by a fuel cell is, in part, dependent on the cost of preparing electrodes and membrane electrode assemblies (MEA). The cost of power produced by a fuel cell is greater than competitive power generation alternatives, partly because of the cost of preparing such electrodes and MEAs. However, power produced from hydrogen-based fuel cells is desirable because hydrogen is environmentally acceptable and hydrogen fuel cells are efficient.

Therefore, it is desirable to improve the manufacture of such assemblies and to improve the cost and render fuel cells more attractive for transportation use.

SUMMARY

The present invention provides a method of making membrane electrode assemblies (MEAs) which, as set forth hereafter, reduces electrode defects, particularly the phenomenon known as mud-cracking. The invention provides two approaches to prepare an electrode, a pretreatment approach and a post-treatment approach. The method utilizes porous substrate for drying slurries applied thereto to form an electrode. In one aspect, the application of the slurries involves a selective use of relatively wetting and non-wetting solvents to regulate the drying of the slurries to form an electrode film.

In the pretreatment approach, a porous support substrate is coated with a wetting solvent such that the solvent is imbibed into the pores. A slurry is formed including an ionically conductive material, a catalyst supported on an electrically conductive material, and a solvent that is non-wetting to the porous substrate. The slurry is well mixed and applied as a layer to the surface of the porous support substrate and dried to form a film. The film is applied to a membrane, and heat and pressure are applied to form a membrane electrode assembly. Advantageously, this method controls the drying to form a more robust electrode by preventing electrode shrinkage and subsequent cracking of the electrodes.

In the post-treatment approach, the process begins by forming a slurry containing an ionically conductive material, a catalyst, and a solvent that is wetting to the porous substrate. The slurry is well mixed and coated onto a surface of the substrate and dried to form a layer. The dried layer is overcoated with a solution of an ionomer and a solvent that is non-wetting to the substrate. This method, in addition to controlling the drying, advantageously provides for more precise control of ionomer content in the electrodes. This occurs because the ionomer is added to the electrode with a solvent that will not penetrate the porous substrate and therefore ionomer is not leached out of the applied layer and into the substrate.

An important feature of the present invention is the use of a porous substrate to prepare a membrane electrode assembly (MEA) sequentially comprising a first electrode, an ionically conductive membrane, and a second electrode. The porous substrate is releasably attached to respective electrodes and this facilitates the handling of the electrodes and the MEA during fabrication steps. The porous substrate enhances the control of drying of the electrode by permitting vapors to pass through the substrate, and provides for better bonding of the electrode to the membrane by permitting passage of water vapor through the porous substrate generated during hot-pressing.

BRIEF DESCRIPTION OF THE DRAWINGS

FIG. 6 is a pictorial illustration of the process of applying the electrode precursor slurry to a porous substrate, drying the slurry, hot pressing the electrode to the membrane, and peeling the sheet from the MEA.

FIG. 7 is a pictorial illustration of, in order, a first porous substrate sheet, the anode, the membrane, the cathode, and a second porous substrate sheet.

FIG. 8 shows a configuration similar to FIG. 7 and also having porous backing material on either side of respective porous substrate sheets.

DETAILED DESCRIPTION OF THE PREFERRED EMBODIMENTS

Figure 1:
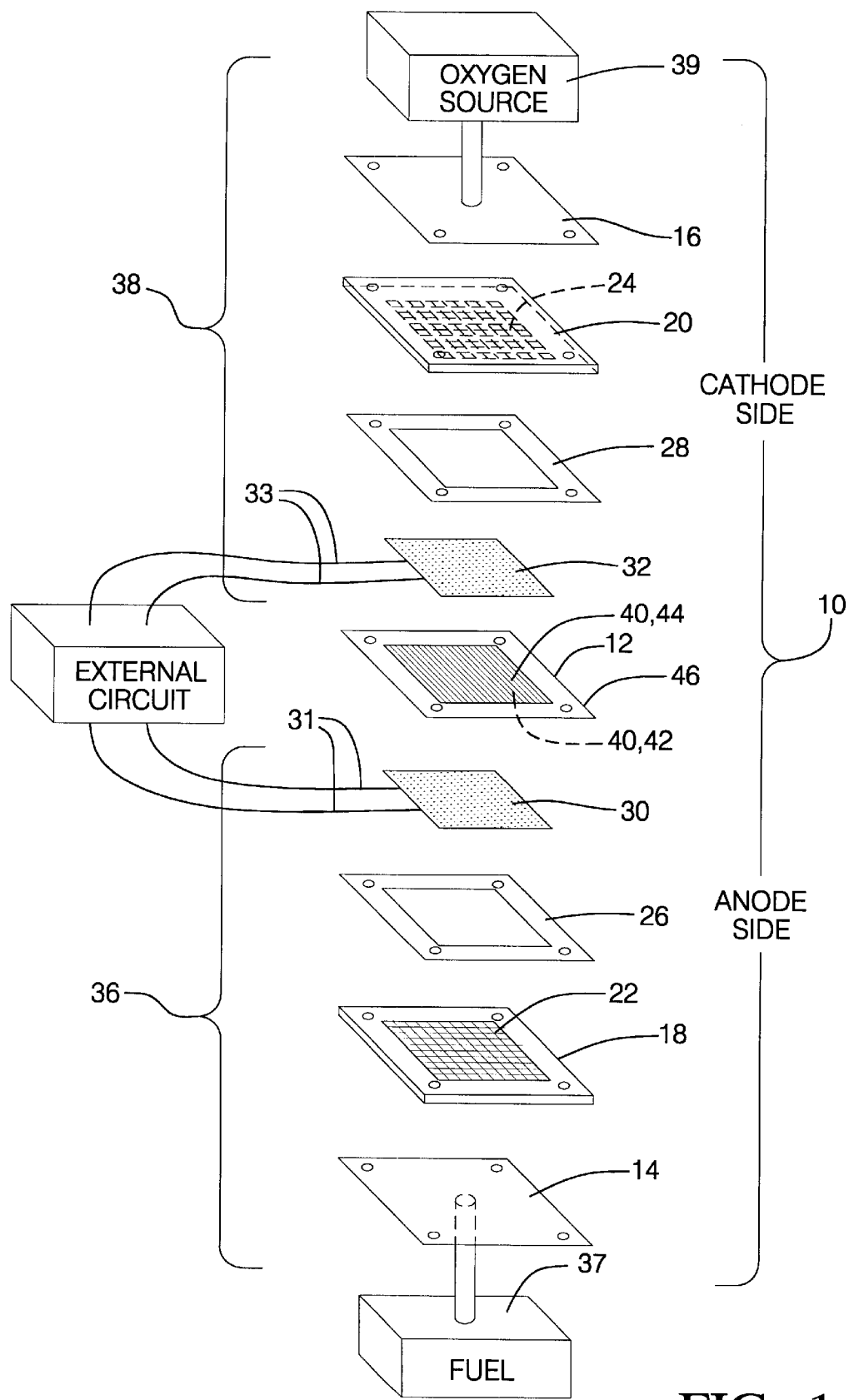
FIG. 1 is a schematic view of an unassembled electrochemical fuel cell having a membrane electrode assembly according to the invention.

The invention is directed to forming electrodes and membrane electrode assemblies for use in fuel cells. Before describing the invention in detail, it is useful to understand the basic elements of a fuel cell and the components of the MEA. Referring to FIG. 1, an electrochemical cell 10 with a combination membrane electrolyte and electrode assembly 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14,16, graphite blocks 18,20 with openings 22,24 to facilitate gas distribution, gaskets 26,28, carbon cloth current collectors 30,32 with respective connections 31,33 and the membrane electrolyte and electrode assembly 12. The two sets of graphite blocks, gaskets, and current collectors, namely 18, 26, 30 and 20, 28, 32 are each referred to as respective gas and current transport means 36,38. Anode connection 31 and cathode connection 33 are used to interconnect with an external circuit which may include other fuel cells.

Electrochemical fuel cell 10 includes gaseous reactants, one of which is a fuel supplied from fuel source 37, and another is an oxidizer supplied from source 39. The gases from sources 37,39 diffuse through respective gas and current transport means 36 and 38 to opposite sides of the MEA 12. Respectively, 36 and 38 are also referred to as electrically conductive gas distribution media.

Figure 2:
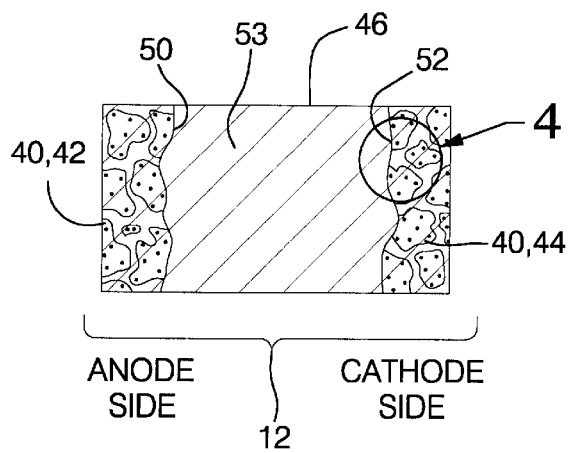
FIG. 2 is a pictorial illustration of a cross-section of a membrane electrode assembly according to the invention.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10. The electrodes of the invention provide proton transfer by intimate contact between the electrode and the ionomer membrane to provide essentially continuous polymeric contact for such proton transfer. Accordingly, the MEA 12 of cell 10 has membrane 46 with spaced apart first and second opposed surfaces 50, 52, a thickness or an intermediate membrane region 53 between surfaces 50, 52. Respective electrodes 40, namely anode 42 and cathode 44 are well adhered to membrane 46, at a corresponding one of the surfaces 50, 52.

Figure 3:
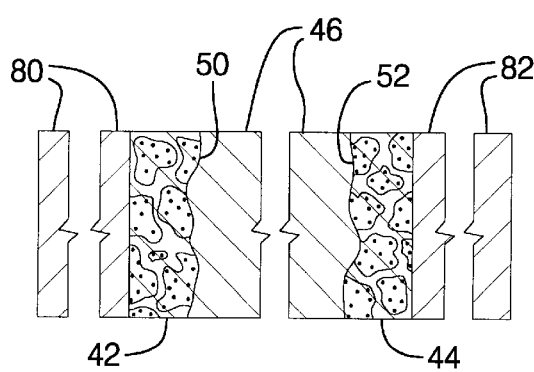
FIG. 3 is a pictorial illustration of a membrane electrode assembly as in FIG. 2, and having graphite sheets.

In one embodiment, respective electrodes 40 (anode 42, cathode 44) further comprise respective first and second Teflonated (polytetrafluoroethylene coated, impregnated) graphite sheets 80, 82, at respective sides of membrane 46. (FIG. 3) The anode active material is disposed between the first surface 50 of the membrane and the first sheet 80; the cathode active material is disposed between the second surface 52 and the second sheet 82. Each Teflonated sheet 80, 82 is about 7.5 to 13 mils thick.

The solid polymer electrolyte (SPE) membrane 46, of the present invention is well known in the art as an ion conductive material. Typical SPE membranes are described in U.S. Pat. Nos. 4,272,353 and 3,134,697, and in Journal of Power Sources, Volume 29 (1990), pages 367–387.

The SPE membranes or sheets are ion exchange resin membranes. The resins include ionic groups in their polymeric structure; one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation ion exchange groups are hydrated sulfonic acid radicals which are attached to the polymer backbone by sulfonation.

The formation of these ion exchange resins into membranes or sheets is also well known in the art. The preferred type is perfluorinated sulfonic acid polymer electrolyte in which the entire membrane structure has ion exchange characteristics. These membranes are commercially available, and a typical example of a commercial sulfonated perfluorocarbon, proton conductive membrane is sold by E.I. DuPont de Nemours & Co. under the trade designation Nafion. Others are sold by Asahi Glass and Asahi Chemical Company. Such proton conductive membranes may be characterized for example by monomers of the structures:

$$CF_2=CFOCF_2CF_2SO_3H$$

and $$CF_2=CFOCF_2CF(CF_3)OCF_2SO_3H$$

In the electrochemical fuel cell 10 of the invention, the membrane 46 is a cation permeable, proton conductive membrane, having $H^+$ ions as the mobile ion; the fuel gas is hydrogen and the oxidant is oxygen or air. The overall cell reaction is the oxidation of hydrogen to water and the respective reactions at the anode 42 and cathode 44 are as follows:

$$H_2 = 2H^+ + 2e$$

$$\tfrac{1}{2}O_2 + 2H^+ + 2e = H_2O$$

Since hydrogen is used as the fuel gas, the product of the overall cell reaction is water. Typically, the product water is rejected at the cathode 44 which is the electrode 40 on the oxygen side. Typically, water then escapes by simple flow or by evaporation. However, means may be provided if desired, for collecting the water as it is formed and carrying it away from the cell.

Water management in the cell is important and key to the successful long-term operation of electrochemical fuel cell 10. Spatial variations of water content within the polymeric electrolyte membrane 46 of a current-carrying fuel cell 10 result from the electro osmotic dragging of water with proton ($H^+$) transport from anode to cathode, the production of water by the oxygen reduction reaction at the cathode, humidification conditions of the inlet gas stream, and "back-diffusion" of water from cathode to anode. Water management techniques and cell designs related thereto are described in U.S. Pat. Nos. 5,272,017 ('017) and 5,316,871 ('871), each incorporated herein by reference in its entirety. Although water management is an important aspect for fuel cell operation, what is equally important is achieving good distribution and movement through the electrodes of the fuel and oxidant. To achieve this goal it is important to have an electrode with a relatively homogeneous porous structure and which has good structural integrity, as such, the present invention is directed to the fabrication of the membrane electrode assembly with a process that significantly reduces excessive "mud-cracking" of the electrodes during the drying stage. Mud-cracking is where significant fissures in the surface of the electrode are created as the electrode film is formed during the drying process. Most catalyst layers will exhibit some degree of "mud-cracking"; however, excessive "mudcracking" is visible to the naked eye and usually results in delamination from the support during drying. As used herein, the term drying refers to removing sufficient solvent from the applied casting slurry or casting solution to provide an electrode film.

The invention provides catalyst substrates comprising carbon, and catalyst distribution and loadings according to the requirements of the hydrogen oxidation and oxygen reduction reactions occurring in the fuel cell 10. In addition, effective proton transfer is provided by embedding electrodes 40 into the membrane 46. Accordingly, the MEA 12 of cell 10 has membrane 46 with spaced apart first and second opposed surfaces 50,52, a thickness or an intermediate membrane region 53 between surfaces 50,52. Respective electrodes 40, namely anode 42 and cathode 44 are well adhered to membrane 46, at a corresponding one of the surfaces 50,52. The good porosity and structural integrity of electrodes formed by the invention facilitates formation of the MEA.

Figure 4:
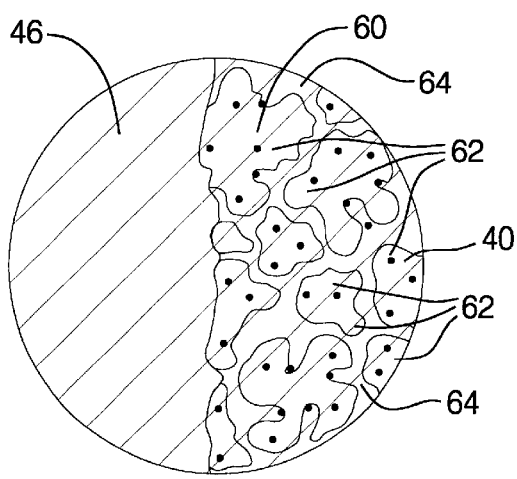
FIG. 4 is a pictorial illustration showing a magnified view of a portion of the cathode side of FIG. 2.

As shown in FIG. 4, each of the electrodes 40 are formed of a corresponding group of finely divided carbon particles 60 supporting very finely divided catalytic particles 62 and a proton conductive material 64 intermingled with the particles. It should be noted that the carbon particles 60 forming the anode 42 may differ from the carbon particles 60 forming the cathode 44. In addition, the catalyst loading at the anode 42 may differ from the catalyst loading at the cathode 44. Although the characteristics of the carbon particles and the catalyst loading may differ for anode 42 and cathode 44, the basic structure of the two electrodes 40 is otherwise generally similar, as shown in the enlarged portion of FIG. 4 taken from FIG. 2.

In order to provide a continuous path to conduct $H^+$ ions to the catalyst 62 for reaction, the proton (cation) conductive material 64 is dispersed throughout each of the electrodes 40, is intermingled with the carbon and catalytic particles 60,62 and is disposed in a plurality of the pores defined by the catalytic particles. Accordingly, in FIG. 4, it can be seen that the proton conductive material 64 encompasses carbon and catalytic particles 60,62.

The carbon particles define pores some of which are internal pores in the form of holes in the carbon particles; other pores are gaps between adjacent carbon particles. Internal pores are also referred to as micropores which generally have an equivalent radius (size) less than about 2 nanometers (nm) or 20 angstroms. External pores are also referred to as mesopores which generally have an equivalent radius (size) of over about 2 nanometers and up to about 20 nanometers or 200 angstroms. The total surface area present in a mass of carbon particles is referred to as BET surface area, expressed in $m^2/gm$. BET surface area accounts for both mesopores and micropores present in the mass. As used herein, the terms "pore" and "pores" refers to both mesopores and micropores and also refers to both internal and external pores unless otherwise indicated.

MEAs require efficient gas movement and distribution to maximize contact between the reactants, i.e., fuel and oxidant, and the catalyst. This region is a porous catalyzed layer and comprises particles of catalysts, particles of electrically conductive material, and particles of ionically conductive material. The dried porous catalyzed layer is the electrode, once the casting solvent has been removed. The three criteria which characterize a good electrode are gas access to the catalyst layer, electrical continuity, and proton access to the ionomer. A typical ionomer is a perfluorinated sulfonic acid polymer, and a typical ionomer used in making the MEA is Nafion. Porosity of the electrode structure in the MEA, in such a scenario, becomes a critical component in accomplishing these objectives. The term solvent, as used herein, refers to the liquids used in the process of the invention. The liquids are characterized as wetting, or relatively less wetting or non-wetting to the porous substrate according to this use. A given liquid is miscible with other liquids used in the process of the invention. The liquids may or may not solubilize individual components of the slurry, but the term solvent will be used to denote the various liquids used in the invention. For example, a component such as the ionomer may be dissolved by the solvent but the carbon and catalyst are not dissolved.

The invention produces a porous electrode by using a porous substrate support with controlled porosity for drying an applied catalyst slurry. The porous support or substrate regulates the rate of drying or evaporation of the casting solvent to thereby form an electrode film.

The porous support is preferably a microporous substrate. The porous structure can have pore sizes ranging from 0.01 to 3.0 microns, with a desirable range of 0.01 to 2.0 microns, and a preferred range from 0.05 to 0.3 microns. A preferred microporous support is an expanded PTFE (ePTFE) film or PTFE (polytetrafluoroethylene) film of desired porosity and pore size. PTFE is also known as Teflon. Such porous support has pores of sufficient size for removing solvent from the slurry, but small enough to prevent the transport of slurry particles into the support. Expanded polytetrafluoroethylene and its porous properties and characteristics are described in U.S. Pat. No. 3,953,566 and is incorporated by reference in its entirety. These characteristics include a structure in which nodes are connected by fibrils. Other microporous structures include any woven or non-woven, porous material to which the electrode will have a low adhesion. This includes materials coated with a non-stick substance. The microporous substrate is preferredly impervious to or relatively nonwettable with liquid water and is permeable and wettable by $C_2$ and higher alcohols. Control is achieved through the use of multiple solvents, at least one of which will permeate the substrate, and at least one of which will not permeate the substrate. Substrates of pore sizes ranging from 0.01 microns to 3.0 microns and preferredly from 0.05 to 0.3 microns are used for this purpose. The microporous substrate thickness desirably ranges from 10 microns to 250 microns and preferredly 25 to 100 microns. However, very thin substrates are difficult to handle and lack sufficient structured rigidity. To facilitate the handling of a thin microporous substrate, it can also be supported by a suitable backing material, i.e., polyester or a porous polyamide, in which case the microporous substrate can be as thin as one micron. Any backing material should also be porous, but can have significantly larger pores. The microporous substrate is preferably selected to maintain its integrity at temperatures up to about 200° C. The backing material is preferably selected to maintain its integrity, structure and adherence to the microporous substrate at temperatures up to about 200° C.

Further features of the porous support are understood with reference to the catalyst slurry, applied and dried to form a film thereon. The catalyst slurry is often referred to as an ink and the terms are used interchangeably herein. The term mixture, as used herein, refers to a combination of substances that have been intermingled and is intended to cover either a mixture, a slurry, or a solution. The term slurry refers to a mixture where there is some suspended and undissolved material within a continuous fluid phase, usually a liquid phase, and the liquid in the liquid phase generally being a solvent. The term solution refers to a mixture where there is a solute dissolved in a solvent, thereby forming a single phase containing two or more different substances. The catalyst slurry is a solution of a proton conducting polymer, herein referred to as an ionomer (e.g. Nafion), with particles of electrically conductive material, typically carbon, and particles of catalyst. The catalyst support is typically the electrically conductive material, i.e., carbon, and the catalyst is typically a metal. Preferred catalysts include metals such as platinum (Pt), palladium (Pd); and mixtures of metals Pt and molybdenum (Mo), Pt and cobalt (Co), Pt and ruthenium (Ru), Pt and nickel (Ni), and Pt and tin (Sn). The ionomer is typically purchased in a solvent of choice and at the desired initial concentration, and additional solvent is added to adjust the ionomer concentration to a desired concentration in the slurry. The slurry optionally contains polytetrafluoroethylene. The catalyst and catalyst support are dispersed in the slurry by techniques such as ultra-sonication or ball-milling. The average agglomerate size in a typical slurry is in the range from 50 to 500 nm. Slight variation in performance is associated with slurries made by different dispersing techniques, due to the disparity in the range of particle sizes produced. Therefore, typical substrate pore sizes must be smaller than the typical catalyst support particle size, and preferredly smaller than the lower range of the particle size distribution. In addition, larger pores leads to a loss of ionomer from the coating ink via absorption into the pores or even leakage through the pores.

Figure 5:
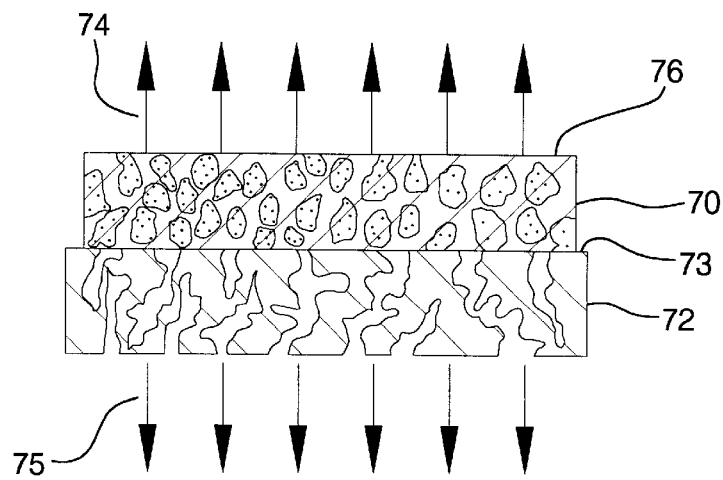
FIG. 5 is a pictorial illustration showing the electrode layer upon the porous substrate.

FIG. 5 illustrates the expanded PTFE 72 support coated with a catalyst layer 70. The catalyst slurry is spread on the porous substrate 72 in one or more layers to form a decal with a preselected concentration of catalyst. The catalyst layer dries by evaporation of solvent out of the top 74 of the catalyst layer 70 and through the porous support 72. As shown by the arrows 74, 75, the evaporation is bi-directional. This provides an increased surface area for the evaporation of solvent, and a reduced distance that solvent must be removed from the catalyst layer, thus the catalyst layer is dried more uniformly. The more uniform drying significantly reduces the incidence of mud-cracking in the formed electrode film. The choice of solvents is a factor in obtaining this bi-directional evaporation, and therefore the process dictates using wetting and non-wetting solvents at different steps. Depending on the solvents in the slurry, the applied slurry is dried and solvent removed therefrom at temperatures ranging from room temperature to 100° C. IR lamps may be used to facilitate drying. Drying may also be performed with the aid of a vacuum.

Since the solvents in the applied ink can evaporate through an ink/microporous substrate interface 73 and through an ink/air interface 76, a homogeneous catalyst layer is produced on the substrate after the drying step. This regulated drying produces a more robust catalyst layer. The catalyst layers are then bonded to the polymer electrolyte membrane by hot-pressing at or above the glass transition temperature, about 135° C. for Nafion under elevated pressures, e.g., 250–550 psi. At this temperature, the ionomer (Nafion) begins to flow, and due to the pressure, disperses well into the porous structure formed. By processing above the glass transition temperature, a good bond is formed between the electrode and the membrane. This is typically called a decal because the transfer process involves applying the dried catalyst layer, i.e. the electrode film, to a membrane and peeling off the substrate. The added advantage of a microporous PTFE substrate for the decal lies in the good transfer of the catalyst layer onto the membrane, due to the weak adhesion of the electrode film to PTFE substrate. The membrane typically contains water at room temperature. During hot-pressing some of this water is vaporized, as well as any residual solvent left in the electrodes. An additional advantage of using a porous support for decal transfer is that vapors formed in the electrode and at the membrane during hot-pressing can escape through the porous support material. This results in improved bonding and adhesion of the electrode to the membrane.

The process is illustrated in FIG. 6. First a support 72 is provided. A layer of ink 70 is added to the support 72. The ink 70 is dried and the dried ink 70 forms the electrode 40. The support 72 with the electrode 40, 70 is hot-pressed to a membrane 46 where the electrode 40, 70 is between the support 72 and the membrane 46. Following hot-pressing, the support 72 is peeled off of the membrane 46 leaving behind a dried electrode film on the membrane 46. As mentioned earlier, factors pertinent to the choice of substrate include relatively low adhesion to the electrode, pore sizes, and the relative amounts of wetting and non-wetting solvents used in the overall process. The low adhesiveness is to ensure after bonding of the electrode to the membrane that the substrate will peel away from the electrode. The pore size is important in limiting imbibement of the ionomer into the substrate while permitting removal of solvent. This limits mechanical attachment. The use of wetting and non-wetting solvents both controls removal of solvent through the substrate, and limits the amount of ionomer carried into the pores.

The use of the microporous substrate is a feature of this invention. The microporous substrate provides an ink/microporous substrate interface for removal of solvent. The control of drying through the microporous structure is accomplished by the use of solvents that are wetting and non-wetting to the porous substrate. As used herein, the term wetting solvent refers to a solvent that "wets" the substrate, or spontaneously is imbibed into or permeates the pores of the substrate. The terms wetting and permeating are used interchangeably. As used herein, the term non-wetting solvent refers to a solvent that does not "wet" the substrate, or cannot be imbibed into or is non-permeating to the porous substrate. The terms non-wetting and non-permeating are used interchangeably. An alternative description for wetting and non-wetting are permeating and non-permeating, respectively, as regards the ability of a solvent to penetrate the porous substrate. Typically, low surface energy materials such as fluorinated hydrocarbon polymers or perfluoronated polymers, and in particular PTFE are used for the substrate because they allow relatively easy transfer of the catalyst layer to the membrane during hot-pressing. Solvents that are wetting to these substrates include any $C_2$ and higher alcohol such as ethanol, n-propyl alcohol, isopropyl alcohol, n-butyl alcohol, sec-butyl alcohol, tert-butyl alcohol, and mixtures thereof. Preferred wetting solvents include isopropyl alcohol and alcohol solutions with isopropyl alcohol as a major constituent. The manner in which the wetting solvent is included in the porous substrate may vary. The porous substrate may be prepared with the solvent included therein, or the solvent may be added during the process as described herein. Available solvents that are non-wetting have high surface tension and include water, glycols, and mixtures thereof. Among the glycols, desired are ethylene glycol, propylene glycol and butylene glycol. These are $C_2$ to $C_4$ dihydric alcohols, that is, dihydric alcohols having 2 to 4 carbons. The preferred glycol is ethylene glycol. The preferred non-wetting solvent is water. In the case of porous PTFE, methanol is intermediate between wetting and non-wetting; it is not spontaneously imbibed but can be imbibed with the application of slight pressure. Non-wetting solvent/methanol mixtures can be designed to achieve precise control of the ionomer distribution within the porous layers described in this invention. For purposes of this invention methanol is considered to be relatively less wetting than the $C_2$ or higher alcohols. Other solvents are useable, but it is preferred that the solvents be evaporable at temperatures close to or slightly greater than room temperature. The choice of solvent is based on criteria such as volatility, evaporability and evaporativity at a temperature which does not compromise the ionomer. A consideration is that the process of forming the electrodes, prior to hot-pressing, preferably proceed below the glass transition temperature of the ionomer, in order to maintain the integrity of the electrode ultimately produced. Accordingly, useful solvents are those having boiling points below about 200° C., desirably below about 150° C., and preferably the solvents having boiling points below about 110° C. Another consideration is the solubility of one solvent with respect to another. The wetting solvent preferably solubilizes the non-wetting solvent for transport through the porous substrate.

Procedure

The catalyst layer dispersion consists of a mixture of the precious metal catalyst supported on high surface carbon, such as Vulcan XC-72, and an ionomer solution such as Nafion (DuPont Fluoroproducts, NC) in a solvent. Available solvents include alcohols, for example iso and normal propanol, ethanol, methanol, water, or a mixture of water and alcohols. The requirement is that the solvents be evaporable at room temperature. The expanded PTFE film is impervious to water and methanol, but permeable to higher alcohols (e.g., ethanol, etc.). Permeating and non-permeating solvents are used to provide a good method of controlling the intrusion of the solvents and the solvents carrying of Nafion into the ePTFE film. This intrusion phenomenon determines the ionomer content in the catalyst layer, i.e., ionomer loss. If the content of non-wetting solvents in the slurry is high, most of the ionomer remains in the catalyst layer. Controlling the content of non-wetting solvent in the slurry is very important as it determines the rate of drying of the catalyst layer and the degree of intrusion, and subsequent loss, of Nafion into the porous support. As a result, the non-wetting solvent content affects the structural integrity of the catalyst layer, and the Nafion content in the electrode. High non-wetting solvent content leads to mud-cracking of the catalyst layer due to non-uniform drying, and seriously compromises its robustness. Low non-wetting solvent content leads to increased seepage of Nafion into the support, and too great a loss of Nafion reduces structural support as the Nafion provides the bond holding the catalyst and catalyst support together with the ionomer.

Based on the solvent-effect described above, two different processes have been identified, both of which provide substantially the same MEAs after hot-pressing of the decals to an ionomer membrane (FIG. 7). The membrane electrode assembly before peeling of the porous substrate layers appears as in FIG. 7. The assembly comprises the electrolyte membrane 46 with an electrode 40, 70 on each side, and a support material 72 on each electrode 40, 70. The membrane electrode assembly with porous support layers is hot-pressed, forming a strong bond between the electrodes 40, 70 and the membrane 46. The porous substrate material 72 is removed before usage of the membrane electrode assembly in a fuel cell. The procedure is applicable to anode and cathode fabrication in the making of an MEA. As stated earlier, a backing material 78 is useable with the porous support. This is shown in FIG. 8. The backing material 78 must adhere to the microporous substrate 72. Very thin porous substrates 72, when on the order of one micron thickness, are difficult to handle. The porous backing material 78 adds a layer of strength and support, and must maintain a sufficient bond such that during the process of removing the substrate from the electrode assembly, the backing layer maintains adhesion with the microporous substrate 72. The bond must be maintained between the porous substrate and the porous backing material through the entire process, and must be sustained through the temperatures obtained during the hot-pressing step. This produces a structure, prior to pealing off the porous substrate, comprising sequentially a first porous backing layer 78 a first porous substrate layer 72, a first electrode 40, an ionically conductive membrane 46, a second electrode 40, a second porous substrate layer 72, and a second porous backing layer 78.

Process A—Pretreatment Approach

Typically in employing the pretreatment approach of the method of the present invention, a substrate of relatively non-adhering material in the form of a sheet is employed which provides support for a layer of a catalyst slurry containing an ionomer, catalyst, and an electrically conductive catalyst support. A typical material is an expanded polytetrafluoroethylene (ePTFE) sheet, better known as a porous Teflon material. The porous Teflon material needs to be sintered to stiffen, or in an alternative, to have an underlying sheet of material used as a support. If an underlying support material is used, the underlying supporting material must be porous, i.e., clothlike.

The formation of the catalyst slurry involves, on the order of 1 gram of 5 to 80 wt. % catalytically active material on carbon, for example Pt on carbon, and on the order of 8 grams of 1 to 30 wt % ionomer solution with a non-wetting or relatively non-wetting solvent. Methanol is used in this case, as it does not wet, or is less wetting, to the ePTFE support. The ionomer seepage into the support is therefore reduced. The catalyst loading, wt % on carbon, is chosen according to the needs and requirements of a specific application. The weight ratio of ionomer to carbon is in the range of 0.20:1 to 2.0:1, with a preferred range of 0.25:1 to 1:1.

For Process A, as illustrated by Example 1, experiments were carried out at a weight ratio of 0.8:1 of ionomer to carbon. In the slurry, the ratio of solids to liquids is in the range 0.15:1 to 0.35:1, that is, 13% to 27% by weight solids in the slurry. The preferred range is 0.2:1 to 0.3:1 or 16% to 23% by weight of solids in the slurry. For Process A, experiments were carried out at a ratio 0.25:1. For the specifications given, methanol makes up about 80% of the slurry weight, and catalyst, ionomer, and carbon makes up the remaining 20%.

Pretreatment of the ePTFE support is necessary before the catalyst layer can be applied. Isopropyl alcohol (IPA)-rich Nafion solution (~1 wt %) or IPA is first coated onto the support by means of either screen-printing, painting or spraying. The IPA is considered a wetting solvent relative to ePTFE. With pretreatment, the pores of the support are filled with IPA, or IPA with small amounts of Nafion. Next, the catalyst slurry is coated onto the still wet pretreated support. The IPA in the pores of the support helps by controlling and lowering the Nafion seepage. It is thought that saturation of the pores of the ePTFE support below, with IPA and Nafion, helps to control the Nafion content in the catalyst layer above. The IPA also facilitates the spreading of the catalyst slurry in a thin layer on the support. The ePTFE film should be partially sintered before any coating is undertaken. Sintering makes the membrane more rigid and resistant to shrinkage during the drying process. The slurries are applied to the porous ePTFE support by any coating technique, for example, screen-printing or Mayer-rod coating. Mayer rod coating, also known as coating with a metering rod, is well known in the art of screen printing or coating processes. Coatings with thicknesses ranging from 5 to 25 $\mu$m or higher are easily obtained and dried on sintered ePTFE membranes by Mayer-rod coating. The porous substrates have thicknesses ranging from 75 to 300 μm. Pore sizes in the support range from 0.01 to 1.5 μm, and preferably 0.07 to 0.2 μm to provide a good decal transfer.

Drying is undertaken in two steps. Immediately upon coating, the decals are dried at 25° C. for about 10 minutes. Drying at room temperature or under IR lamps is sufficient to eliminate all the solvents in the catalyst layer. After the drying step, the decals are weighed to determine the solids content. Here, some seepage of the ionomer into the support is typical in order to obtain a well-dried robust catalyst layer. The initial pretreatment with IPA helps to limit and regulate ionomer seepage.

Following decal formation, the decal is hot-pressed against a membrane. The membrane is an ionomer such as a perfluorosulfonated polymer. The membrane and decal are pressed between plates at 500 p.s.i.g. at 146° C. The pressed membrane must be heated above the glass-transition temperature of the membrane for good bonding between the membrane and the electrode.

Specific conditions for hot-pressing the electrode and membrane will vary depending on the choice of membrane material. Hot-pressing can be carried out from about 200 p.s.i.g. to about 1000 p.s.i.g., at temperatures from about 120° C. to about 190° C., and over about 1–12 minutes.

Hot-pressing is preferably carried out at pressures from about 300 p.s.i.g. to about 600 p.s.i.g.,.and at temperatures from about 140° C. to about 160° C., and over about 2–8 minutes.

In a preferred alternative, a second decal is applied to the membrane at the same time. The decals are applied to opposite sides of the membrane.

The mass of Nafion transferred during hot-pressing may be up to 50% lower than the mass of Nafion in the ink applied onto the decal; the transfer of catalyst and catalyst support is better than 95%. This was verified by weight-gain measurements upon coating, and acid-base titration for Nafion content in the decal after hot-pressing. The dried electrode layer produced by this specification is made up of about 85% wt of the catalyst and catalyst support and about 15% wt of ionomer.

The porous support is able to be removed any time after hot-pressing. The support may simply be pulled off after permitting the support to cool slightly. The invention is further described by the following example which is illustrative and not limiting.

EXAMPLE 1

1. An expanded film of PTFE (Teflon), having a microporous structure was sintered and used as a substrate. The substrate had a porosity of 80–90% and an average pore size of 0.2 microns.

2. A catalyst slurry was formed including 1 gram of 20 wt % Pt supported on XC-72 Vulcan carbon (E-Tek, Inc., Natick, Mass.), and 8 grams of 10 wt % Nafion solution (Solution Technologies). The solvent in the solution was methanol. Ball milling for 24 hours produced particles with sizes tightly distributed around 200 nanometers (0.2 microns).

3. The substrate was pretreated with a coating of isopropyl alcohol (IPA) containing 1 wt. % Nafion.

4. The catalyst slurry was coated onto the still-wet pretreated substrate. The pretreatment aids in the spreading of the catalyst slurry on the substrate.

5. The catalyst slurry was dried at 25° C. for about 10 minutes, and then dried under infrared lamps until all the solvents have been eliminated. The dried decals were weighed to determine the solids content.

6. The decals were hot-pressed against a membrane at 146° C. under 500 p.s.i.g. pressure for 4–5 minutes. The membrane had a thickness of 50 microns with an equivalent weight of 1100.

7. The porous support was pealed off after hot-pressing. The membrane electrode assembly as in FIG. 2 is produced by this method.

Alternatively, Nafion could also be applied onto a catalyst layer applied onto the ePTFE support. This method (Process B), as explained below, is versatile in being able to control the ionomer loading in the catalyst layer.

Process B—Post Treatment Approach

Since IPA is known to wet and seep through the ePTFE support, the catalyst dispersion contains catalyst and ionomer in IPA as the solvent. On the order of one gram of 5–80 wt % catalytically active material supported on carbon, on the order of 9 grams of 1–30 wt % ionomer solution, and on the order of 5 grams of a wetting solvent or solvent solution are used to make up the catalyst slurry. So for the specifications given, the alcohols are typical wetting solvents and make up 60% of the total liquid content and water makes up the remaining 40%. The same dispersion techniques as in Process A are used in this case.

The catalyst loading, wt % on carbon, is chosen according to the needs and requirements of a specific application. Factors effecting the loading include porosity and surface area per unit weight of support material. Typically, the range is from 5 to 80 wt %. For experimental comparison, 20 wt % was chosen.

The ratio of ionomer to carbon is in the range of 0.20:1 to 2.0:1, with a preferred range from 0.25:1 to 1:1. For Process B, experiments were carried out at a ratio of 0.8:1 ratio of ionomer to carbon. In the slurry, the ratio of solids to liquids is in the range from about 0.06:1 to 0.15:1, that is, about 5% to about 14% by weight of solids in the slurry. The preferred range is 0.08:1 to 0.12:1, or about 7% to about 11% by weight of solids in the slurry. For Process B, experiments were carried out at a ratio of 0.107:1.

Again, techniques like screen-printing and Mayer-rod coating are used to apply the catalyst dispersion onto the ePTFE support. No pretreatment of the support is necessary in this case. Due to the IPA in the catalyst dispersion, there is some ionomer seepage into the support.

The same drying treatment as in Process A is done in this procedure. Drying with an Infra-red lamp is recommended. Care should be taken that the decals be completely dry before subsequent processing is done, otherwise the decal tends to shrink.

After the decals have been dried, a ionomer solution in a relatively non-wetting or less wetting solvent is applied onto the dried catalyst layer, as per the final ionomer loading desired. The ionomer solution penetrates the electrode but does not seep through the support due to the presence of a relatively less wetting or non-wetting solvent. The decal is dried at room temperature again, and weighed to determine the ionomer loading and the catalyst loading. The ionomer distribution within the catalyst layer is controlled by the methanol to water ratio. A high methanol concentration leads to complete penetration of the catalyst layer. Multiple coatings are possible.

The same hot-pressing conditions as in Process A are used for this process. Again, the Nafion loss is in the range of 40–50% of that in the catalyst ink.

EXAMPLE 2

1. An expanded film of PTFE (Teflon), having a microporous structure was sintered and used as a substrate.

The substrate had a porosity of 80–90% with an average pore size of 0.2 microns.

2. A catalyst slurry was formed including 1 gram of 20 wt % Pt supported on XC-72 Vulcan carbon (E-Tek, Inc., Natick, Mass.), and 9 grams of 5 wt % Nafion solution (SE-5112, DuPont, Delaware). The solvent in the solution was 60% water and 35% alcohols (methanol, IPA, etc.). An additional 5 grams of isopropyl alcohol was added to raise the alcohol content to 60% of the total liquid content. Ball milling for 24 hours produced particles with sizes tightly distributed around 200 nanometers (0.2 microns).

3. The catalyst slurry was coated onto the substrate.

4. The catalyst slurry was dried at 25° C. for about 10 minutes, and then dried under infrared lamps until all the solvents have been eliminated. Care should be taken to ensure the decal is completely dry.

5. The decal was overcoated with a Nafion solution. The solvent is methanol to allow Nafion seepage throughout the catalyst layer but to prevent Nafion seepage into the support. As much Nafion can be added in this manner as desired.

6. The decal was re-dried at room temperature until all the solvent is removed. The dried decals were weighed to determine the solids content.

7. The decals were hot-pressed against a membrane at 146° C. under 500 p.s.i.g. pressure for 4–5 minutes. The membrane had a thickness of 50 microns with an equivalent weight of 1100.

Performance of MEAs

Figure 9:
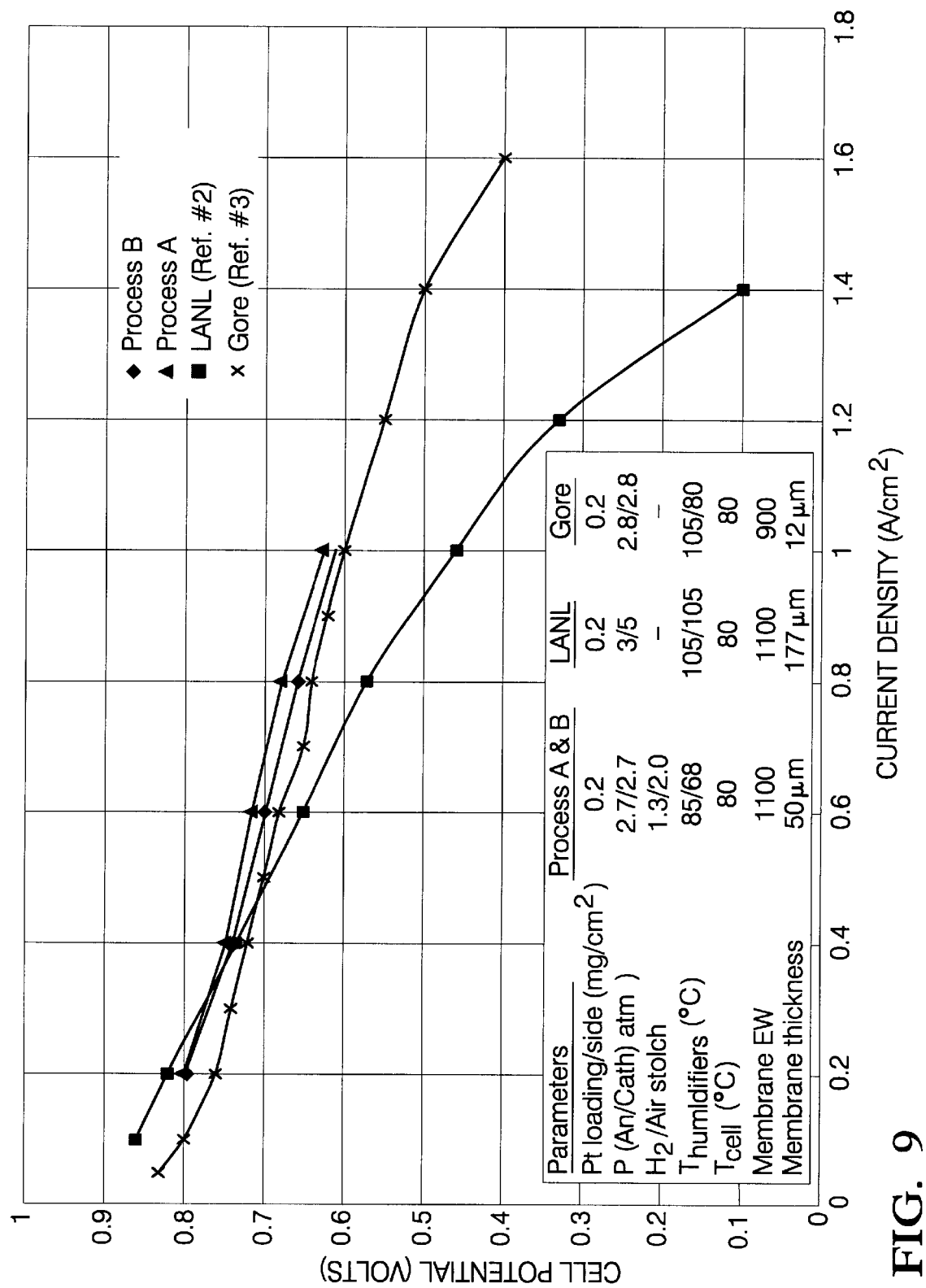
FIG. 9 shows the cell potential as a function of current density for membrane electrode assemblies formed by the inventive Processes A and B, as compared to membrane electrode assemblies formed using conventional methods.

FIG. 9 illustrates the performance of MEAs made from both Processes A and B. Data from literature on prior or existing methods of MEA preparation techniques are also shown in the figure. The MEAs were tested with pressures of the gas reactants (fuel and oxidant) at 2.7 atmospheres at both the anode and cathode sides of the MEA. The fuel was $H_2$ and the oxidant was air. Both $H_2$ and air were humidified and the gases were flowed at a 1.3/2.0 ($H_2$/air) stoichiometry. The above-mentioned stoichiometric ratio (1.3$H_2$/2.0Air) can be further understood in terms of utilization. The amount of gas (number of moles) supplied in would be equal to the amount of gas coming out, when the fuel cell is not in operation. During operation, it is observed that the amount of gas coming out is less than the gas going in because the reactant utilization in the cell is always less than unity due to various considerations. In order to maintain the desired reaction kinetics more gas is supplied than what is utilized in the reaction. Utilization would be ($[H_2,in]-[H_2,out])/[H_2,in]$. Therefore, stoichiometry would be stoichiometry=1/utilization. For example, the utilization of $H_2$ is 0.77 mole when 1 mole is passed in so, stoichiometry equals 1/.77 which equals 1.3 $H_2$.

It should be noted, however, that the testing conditions such as the operating pressures, reactant stoichiometries, and parameters such as membrane thickness and equivalent weight are also different for each case. Nevertheless, it can be seen that the performance is very comparable for the same Pt loading. In fact, the MEAs of Processes A and B show superior performance at current densities above 0.2 A/cm$^2$. At higher current densities, where the issue of flooding becomes critical, the MEAs made by Processes A and B perform exceptionally better than the reference MEAs.

For purposes of comparison with existing methods of MEA preparation, a 20 wt % loading of Pt on carbon was used. Using a 20 wt % Pt/Vulcan XC-72 catalyst (E-Tek) at a loading of 0.2 mg Pt/cm$^2$/electrode, the optimum Nafion loading for processes A and B were found to be on the order of 0.5 mg Nafion/cm$^2$/electrode. This optimum Nafion loading, however, does depend on the nature (electrochemical Pt surface area) of the catalyst. It should to be noted that other important electrode parameters such as catalyst layer thickness, ionomer (and membrane) equivalent weight, and the membrane thickness are parameters affecting performance.

The present invention provides several advantages. Among the advantages are the use of a porous substrate for more controlled drying of the electrode, and lower processing temperatures in the fabrication of MEAs. Prior art methods used non-porous substrates impervious to the solvents, such as teflon-coated and impregnated fiberglass fabric. Use of non-porous substrates impervious to solvents presented problems such as non-uniform catalyst layer thickness and mud-cracking. As mentioned above, the porous substrate provides an increased surface area for removal of solvent. This reduces shrinkage through a more uniform drying of the catalyst slurry, and provides a more uniform electrode film. In addition electrodes made by prior art processes are hot pressed to the membrane at relatively higher temperatures and pressures. This required converting the ionomer from a protonated form to a sodium ion or potassium ion form, and subsequently converting back to the protonated form. These can be time consuming steps that require subsequent treatment of waste products. The present invention avoids such added processing.

In summary, the invention provides methods to produce membrane electrode assemblies with robust electrodes leading to good performance, by alleviating or reducing the incidence of excessive mud-cracking.

While this invention has been described in terms of certain embodiments thereof, it is not intended that it be limited to the above description, but rather only to the extent set forth in the following claims.

What is claimed is:

1. A method of making an assembly comprising an electrode, which method comprises:

providing a porous substrate having a first solvent present in the pores of the substrate;

applying a slurry onto the porous substrate, said slurry comprising an ionically conductive material, an electrically conductive material, a catalyst, and a second solvent that is relatively less wetting or non-wetting to the substrate as compared to the first solvent; and removing sufficient solvent from the applied slurry to form an electrode film on said substrate.

2. The method of claim 1 where the porous substrate is a woven or non-woven fluorinated polymeric material.

3. The method of claim 2 where the porous substrate is a sheet of expanded polytetrafluoroethylene.

4. The method of claim 1 where the first solvent is selected from the group consisting of isopropyl alcohol, n-propanol, n-butanol, s-butanol, t-butanol, ethanol, and mixtures thereof.

5. The method of claim 2 where the first solvent is selected from the group consisting of isopropyl alcohol, n-propanol, n-butanol, s-butanol, t-butanol, ethanol, and mixtures thereof.

6. The method of claim 5 where the first solvent is isopropyl alcohol.

7. The method of claim 1 where the electrically conductive material is carbon and the catalyst is a metal.

8. The method of claim 1 where the ionically conductive material is a perfluorosulfonate ionomer.

9. The method of claim 1 where the second solvent is selected from the group consisting of methanol, water, dihydric alcohols having 2 to 4 carbons, and mixtures thereof.

10. The method of claim 2 where the second solvent is selected from the group consisting of methanol, water, dihydric alcohols having 2 to 4 carbons, and mixtures thereof.

11. The method of claim 1 wherein two electrode films are formed and each said film is applied to an opposite face of a membrane.

12. A method of making an assembly comprising an electrode, which method comprises:

applying a casting slurry onto a porous substrate, said casting slurry comprising an ionomer, an electrically conductive material, a catalyst, and a first solvent;

removing sufficient solvent from the applied casting slurry to form a film on the porous substrate;

applying a casting solution to the film, said casting solution comprising an ionomer and a second solvent that is relatively less wetting or non-wetting to the substrate as compared to the first solvent;

removing sufficient solvent from the applied casting solution to form an electrode film on said substrate.

13. The method of claim 12 where the porous substrate is a woven or non-woven fluorinated polymeric material.

14. The method of claim 13 where the porous substrate is a sheet of expanded polytetrafluoroethylene.

15. The method of claim 12 where the first solvent is selected from the group consisting of isopropyl alcohol, n-propanol, n-butanol, s-butanol, t-butanol, ethanol, and mixtures thereof.

16. The method of claim 15 where the first solvent is isopropyl alcohol.

17. The method of claim 12 where the electrically conductive material is carbon and the catalyst is a metal.

18. The method of claim 12 where the ionically conductive material is a perfluorosulfonate ionomer.

19. The method of claim 12 where the second solvent is selected from the group consisting of methanol, water, dihydric alcohols having 2 to 4 carbons, and mixtures thereof.

20. The method of claim 12 wherein two electrode films are formed and each said film is applied to an opposite face of a membrane.

21. In a method of making an electrode comprising forming a casting slurry comprising an ionomer, an electrically conductive material, a catalyst, and a casting solvent, and applying said casting slurry to a support and then removing said casting solvent to provide an electrode film, the improvement comprising: selecting said support in the form of an expanded polymer porous substrate which is capable of imbibing at least one solvent selected from the group consisting of alcohols and mixtures of water and alcohol.

22. In a method of making an electrode comprising forming a casting slurry comprising an ionically conductive material, an electrically conductive material, a catalyst, and a casting solvent, and applying said casting slurry to a support and then removing said casting solvent to provide an electrode film, the improvement comprising: selecting said support in the form of a porous substrate; wherein the porous substrate is relatively wettable by a first solvent, relatively less wettable or non-wettable by a second solvent, said first solvent is imbibed in pores of said porous substrate to form an imbibed substrate, and said casting slurry is applied to said imbibed substrate where said casting solvent of said casting slurry is said second solvent.

23. In a method of making an electrode comprising forming a casting slurry comprising an ionically conductive material, an electrically conductive material, a catalyst, and a casting solvent, and applying said casting slurry to a support and then removing said casting solvent to provide an electrode film, the improvement comprising: selecting said support in the form of a porous substrate; wherein the porous substrate is relatively wettable by a first solvent and relatively less wettable or non-wettable by a second solvent; said casting slurry having said first solvent as said casting solvent is applied to the substrate and then dried to form a film; a casting solution is applied to the dried film, where said casting solution comprises an ionically conductive material and said second solvent; and then said applied casting solution is dried to form said electrode film.

24. An assembly sequentially comprising:

an ionically conductive membrane;

an ionically conductive and catalytically active electrode; and a porous substrate comprising an expanded fluorinated polymeric material having nodes interconnected by fibrils.

25. The assembly of claim 24 wherein said porous substrate comprises expanded polytetrafluoroethylene.

26. An assembly sequentially comprising:

an ionically conductive membrane;

an ionically conductive and catalytically active electrode; and a porous substrate releasably adhered to the electrode, said porous substrate comprising a woven or non-woven fluorinated polymeric material; wherein said porous substrate comprises a first layer which is said woven or non-woven fluorinated polymeric material, and a second layer adhered to the first layer, where said second layer is a porous polymeric material.

27. The assembly of claim 26 wherein said second layer comprises polymeric material selected from the group consisting of polyester, polyamide, and mixtures thereof.

* * * * *